United States Patent
Chen

(10) Patent No.: US 9,812,833 B2
(45) Date of Patent: Nov. 7, 2017

(54) SFP SOCKET CONNECTOR

(71) Applicant: OUPIIN ELECTRONIC (KUNSHAN) CO., LTD, Kunshan, Jiangsu (CN)

(72) Inventor: Hsin Chih Chen, Jiangsu (CN)

(73) Assignee: OUPIN ELECTRONIC (KUNSHAN) CO., LTD, Kunshan (CN)

( * ) Notice: Subject to any disclaimer, the term of this patent is extended or adjusted under 35 U.S.C. 154(b) by 0 days.

(21) Appl. No.: 15/352,592

(22) Filed: Nov. 16, 2016

(65) Prior Publication Data

US 2017/0279236 A1    Sep. 28, 2017

(30) Foreign Application Priority Data

Mar. 23, 2016 (CN) .......................... 2016 1 0167305

(51) Int. Cl.
| | |
|---|---|
| H01R 13/648 | (2006.01) |
| H01R 33/76 | (2006.01) |
| H01R 24/60 | (2011.01) |
| G02B 6/38 | (2006.01) |
| H01R 107/00 | (2006.01) |

(52) U.S. Cl.
CPC ....... *H01R 33/7664* (2013.01); *G02B 6/3887* (2013.01); *H01R 24/60* (2013.01); *H01R 33/7671* (2013.01); *H01R 2107/00* (2013.01); *H01R 2201/04* (2013.01)

(58) Field of Classification Search
CPC .............. H01R 13/5025; H01R 13/506; H01R 13/6272; H01R 13/65802; H01R 13/7175; H05K 9/0058; G02B 6/4201

USPC ................................ 439/607.21, 607.2, 490
See application file for complete search history.

(56) References Cited

U.S. PATENT DOCUMENTS

| | | | |
|---|---|---|---|
| 7,704,097 B1 * | 4/2010 | Phillips .............. | H01R 13/7172 439/607.01 |
| 8,684,765 B2 * | 4/2014 | Shirk ................... | G02B 6/0008 362/551 |
| 8,870,595 B2 * | 10/2014 | Schmitt ............. | H01R 13/6587 439/607.25 |
| 9,252,538 B2 * | 2/2016 | Recce ................. | H01R 13/641 |

\* cited by examiner

*Primary Examiner* — Hien Vu
(74) *Attorney, Agent, or Firm* — Soroker Agmon Nordman

(57) ABSTRACT

An SFP socket connector is disclosed in this invention. In a socket housing of the SFP socket connector, one row of upper terminal-receiving grooves are located on an inner side of a top wall and extend to a mounting space, and some of the other row thereof are formed between upper support bars and extend to the mounting space. One row of lower terminal-receiving grooves are located on an inner side of a bottom wall and extend to the mounting space, and some of the other row thereof are formed between lower support bars. The shielding case has an upper port aligned with two rows of upper terminal-receiving grooves and a lower port aligned with two rows of lower terminal-receiving grooves. Multiple terminal assemblies are mounted in the socket housing and are arranged side by side in the order of ground-signal-signal.

9 Claims, 8 Drawing Sheets

SFP SOCKET CONNECTOR

BACKGROUND OF THE INVENTION

1. Field of the Invention

The present invention relates to a connector technology, and more particularly to an SFP socket connector with a compact structure.

2. Description of the Prior Art

An SFP (Small Form-factor Pluggable) connector is used in a common high-speed direct cable and a high-speed optical fiber cable. The common SFP socket connector includes an upper extension part forming an upper card-receiving slot and a lower extension part forming a lower card-receiving slot.

Above existing structures has been widely adopted. But with the development of miniaturization and lightweight of all kinds of electronic products in recent years, the SFP socket connector must be further smaller and lighter, it is difficult to make a breakthrough in the existing structure.

Hence, it is necessary to further develop an SFP socket connector with a smaller and lighter structure.

BRIEF SUMMARY OF THE INVENTION

An object of the present invention is to provide an SFP socket connector, which includes a socket housing with a compact structure and has the characteristics of small and light.

Other objects and advantages of the present invention may be further understood from the technical features disclosed by the present invention.

To achieve the aforementioned object or other objects of the present invention, the present invention adopts the following technical solution.

The present invention provides an SFP socket connector, which comprises a socket housing, a shielding case, multiple terminal assemblies and a light guide tube assembly. The socket housing includes a mating portion extending forward and a mounting portion extending rearward. The mating portion has an opening located on the front of the mating portion and a receiving cavity extending rearward from the opening. The mating portion further has a top wall, a bottom wall, a rear wall and two sidewalls, which together define the receiving cavity and the opening. The mating portion includes a row of upper support bars located in the receiving cavity and adjacent to the top wall, and a row of lower support bars located in the receiving cavity and adjacent to the bottom wall. The upper and lower support bars are symmetrical to each other, horizontally extend forward from the rear wall and are not exposed outside the mating portion. The mounting portion forms a mounting space. The socket housing further includes two rows of upper terminal-receiving grooves and two rows of lower terminal-receiving grooves. One row of upper terminal-receiving grooves are located on an inner side of the top wall and extend to the mounting space; and some of the other row of upper terminal-receiving grooves are formed between these upper support bars and extend to the mounting space. One row of lower terminal-receiving grooves are located on an inner side of the bottom wall and extend to the mounting space; and some of the other row of lower terminal-receiving grooves are formed between these lower support bars and extend to the mounting space. The shielding case is mounted on the socket housing and has an upper port and a lower port. The upper port is aligned with the two rows of upper terminal-receiving grooves, and the lower port is aligned with the two rows of lower terminal-receiving grooves. Multiple terminal assemblies are mounted in the socket housing and include multiple signal terminal assemblies and multiple ground terminal assemblies, which are arranged side by side in the order of ground-signal-signal. Each terminal assembly includes a support frame, a pair of upper conductive contact parts extending forward from the front of the support frame, a pair of lower conductive contact parts extending forward from the front of the support frame, and four conductive tails extending downward from the bottom of the support frame. The pair of upper conductive contact parts are inserted into the corresponding upper terminal-receiving grooves and are exposed in the receiving cavity, and the pair of lower conductive contact parts are inserted into the corresponding lower terminal-receiving grooves and are exposed in the receiving cavity. The light guide tube assembly is mounted on the socket housing.

In one embodiment, the socket housing further includes a row of through holes passing through the rear wall and extending to the mounting space; each terminal assembly further includes a positioning piece, which extends forward from the front of the support frame and is located between the pair of upper conductive contact parts and the pair of lower conductive contact parts.

In one embodiment, these upper support bars include a pair of large-size upper support bars and multiple small-size upper support bars; the length of each large-size upper support bar is more than that of each small-size upper support bar. These lower support bars include a pair of large-size lower support bars and multiple small-size lower support bars; the length of each large-size lower support bar is more than that of each small-size lower support bar. Some of the other row of upper terminal-receiving grooves are formed between these small-size upper support bars, and others thereof are formed on the top of the pair of large-size upper support bars. Some of the other row of lower terminal-receiving grooves are formed between these small-size lower support bars, and others thereof are formed on the bottom of the pair of large-size lower support bars.

In one embodiment, the mounting portion forms multiple swallow-tailed long grooves on the top of the mounting space; and the support frame forms a half swallow-tailed long protrusion on the top of the support frame; the half swallow-tailed long protrusions of two adjacent terminal assemblies construct a complete swallow-tailed long protrusion to be engaged with the corresponding swallow-tailed long groove.

In one embodiment, the pair of upper conductive contact parts are slightly staggered along the left and right direction, the pair of lower conductive contact parts are also slightly staggered along the left and right direction, and the four conductive tails are not aligned in one straight line, but are staggered.

In one embodiment, the shielding case includes a shielding frame, a bottom plate mounted on the shielding frame, a rear plate mounted on the shielding frame, two covers around the front of the shielding frame, a spacer located in the middle of the shielding frame for separating the upper port and the lower port, and a grounding spring being located inside the shielding frame and being fixed on the socket housing.

In one embodiment, the spacer is U-shaped, and has an upper horizontal plate and a lower horizontal plate; the upper horizontal plate forms a pair of upper slits on the rear thereof, and the lower horizontal plate forms a pair of lower slits on the rear thereof. The mating portion disposes two recesses, which are respectively formed on the front of the two sidewalls; the upper and lower horizontal plate enter into the recesses, and a vertical edge of each recess is successfully inserted into the corresponding upper and lower slits for fixing the spacer.

In one embodiment, the grounding spring is U-shaped, and has a pair of first elastic fingers protruding forward and a pair of second elastic fingers respectively protruding toward two sides.

In one embodiment, the light guide tube assembly includes two pairs of light guide tubes, tails of which are mounted on two sides of the socket housing, and front ends of which are located in front of the socket housing and are fixed by a retainer; each pair of the light guide tubes include two symmetrical light guide tubes, which are connected and fixed together, and are made of materials suitable for propagating light.

In comparison with the prior art, the SFP socket connector of the present invention is small and light by the socket housing having a compact structure.

DETAILED DESCRIPTION OF THE PREFERRED EMBODIMENTS

The following description of every embodiment with reference to the accompanying drawings is used to exemplify a specific embodiment, which may be carried out in the present invention. Directional terms mentioned in the present invention, such as "up", "down", "front", "back", "left", "right", "top", "bottom" etc., are only used with reference to the orientation of the accompanying drawings. Therefore, the used directional terms are intended to illustrate, but not to limit, the present invention.

Figure 1:
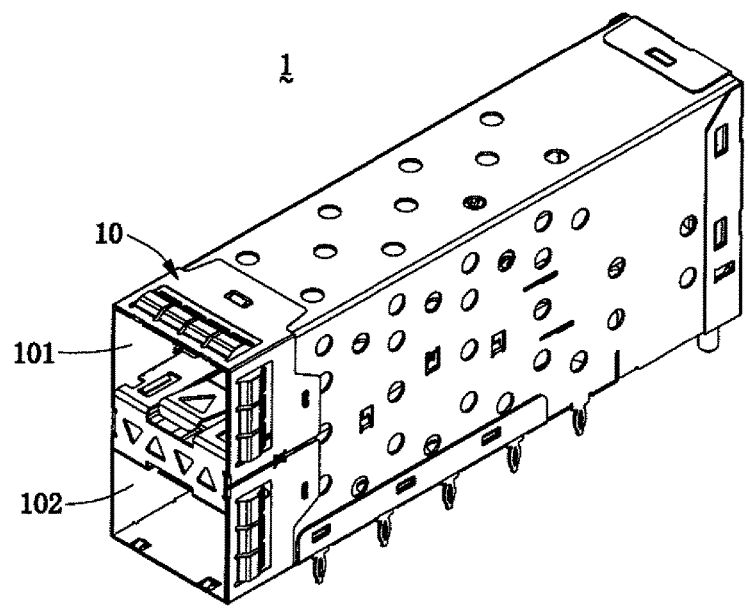
FIG. 1 is a perspective schematic view of an SFP socket connector of the present invention.
Figure 2:
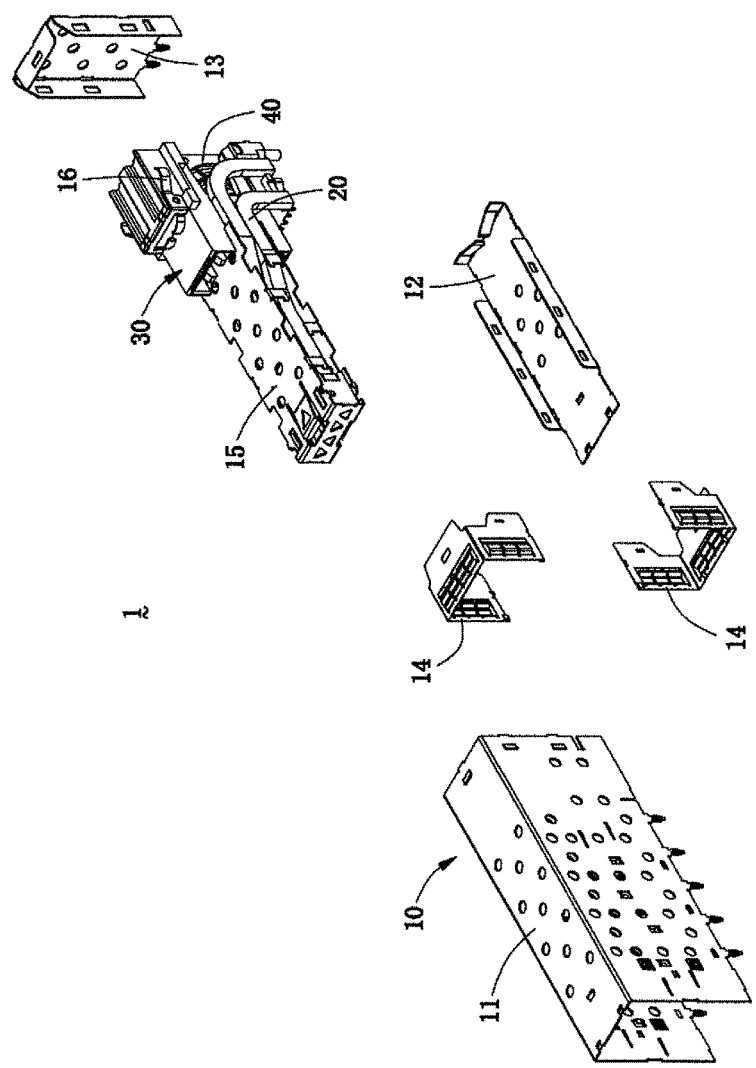
FIG. 2 is a perspective schematic view of the SFP socket connector, wherein a shielding case is disassembled.
Figure 3:
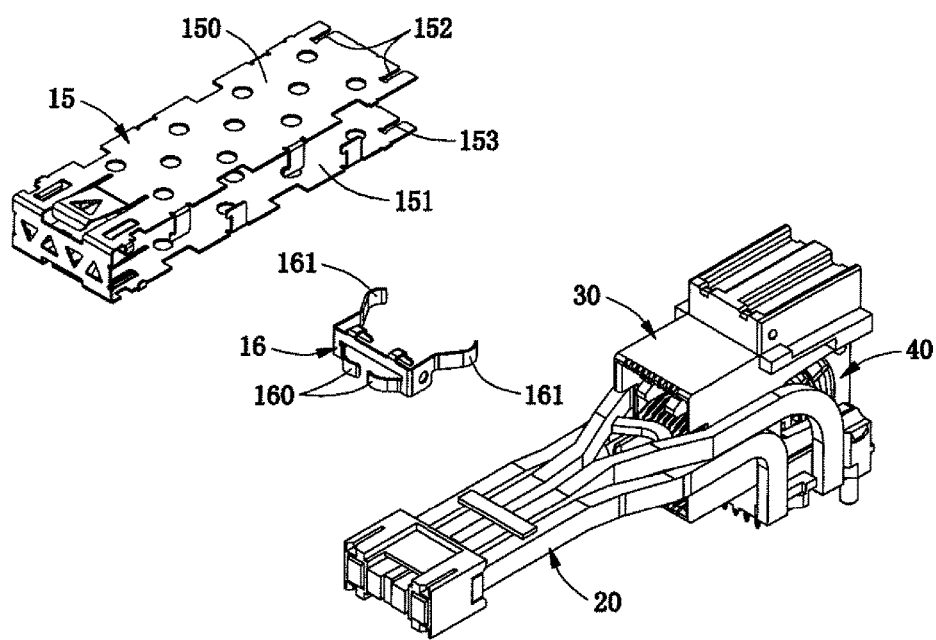
FIG. 3 is a perspective schematic view showing that a spacer and a grounding spring of FIG. 2 are further disassembled.
Figure 4:
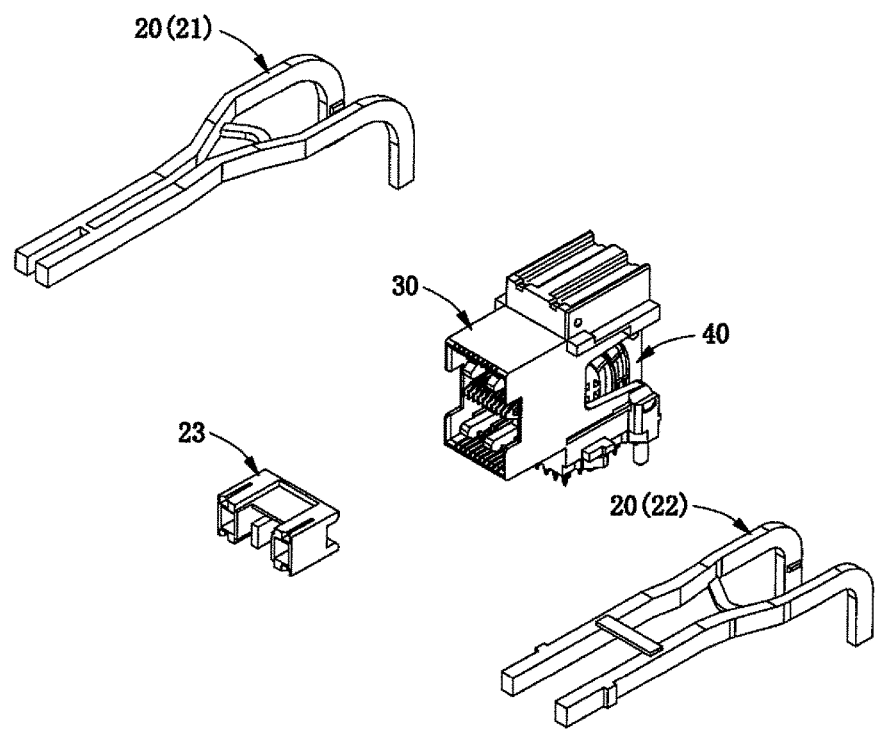
FIG. 4 is a perspective schematic view showing that a light guide tube assembly of FIG. 3 is disassembled.
Figure 5:
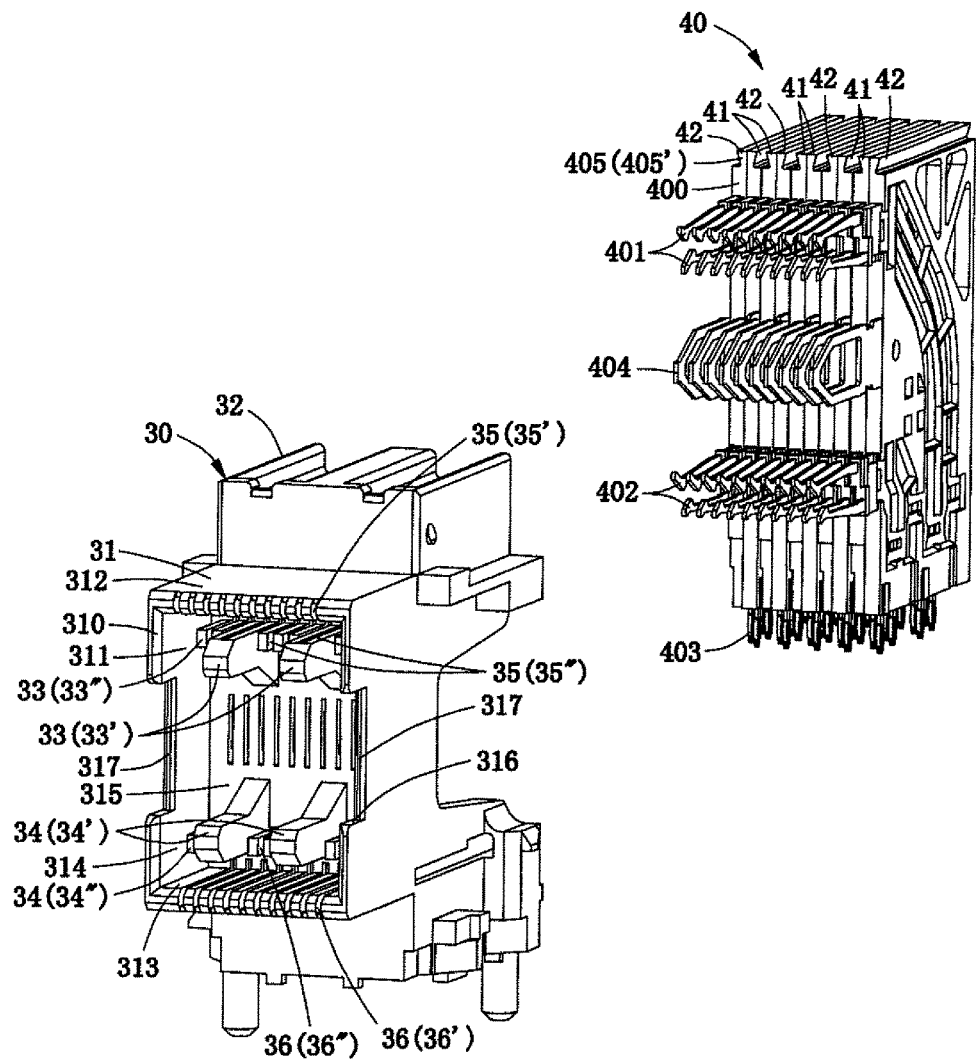
FIG. 5 is a perspective schematic view of a socket housing and multiple terminal assemblies, which are disassembled.
Figure 6:
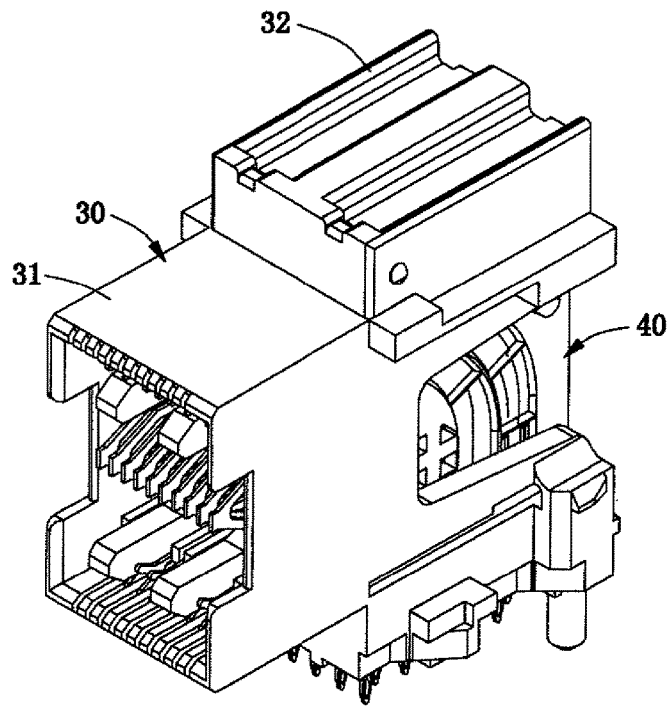
FIG. 6 is a perspective schematic view of the socket housing and the terminal assemblies, which are assembled.
Figure 7:
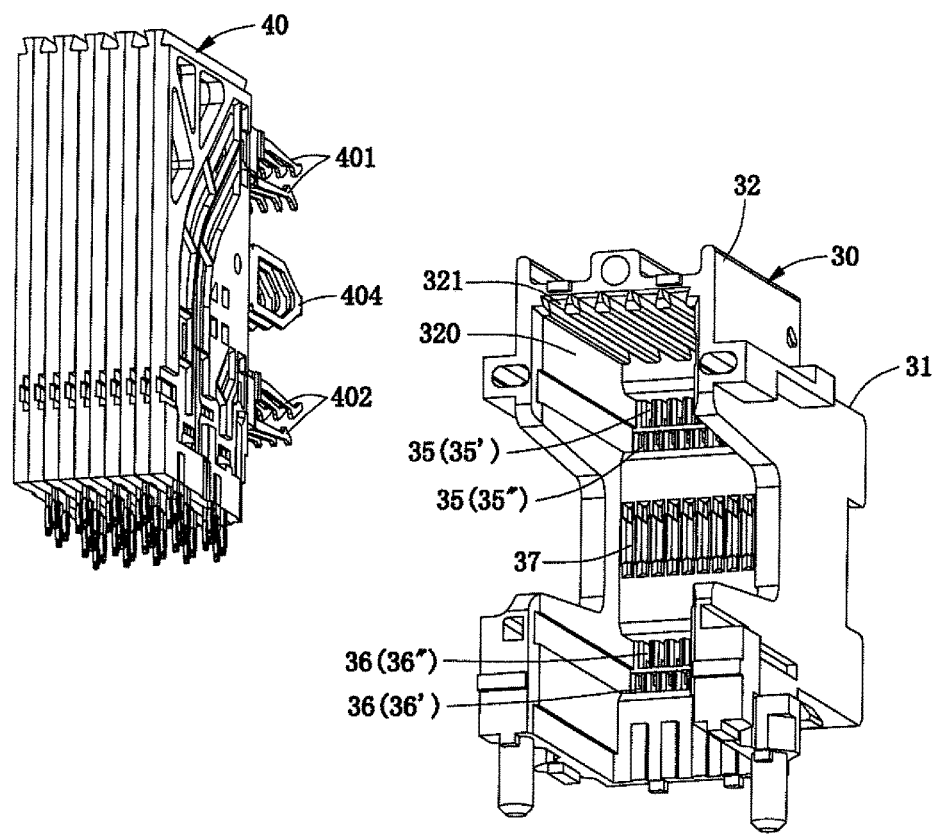
FIG. 7 is a perspective schematic view showing that the socket housing and the terminal assemblies of FIG. 5 are disassembled along another direction.
Figure 8:
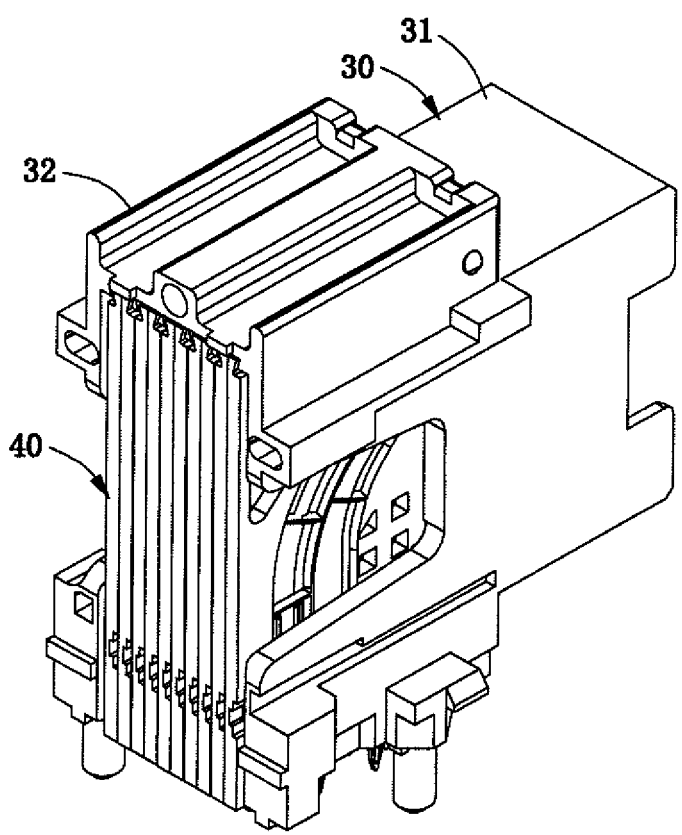
FIG. 8 is a perspective schematic view showing that the socket housing and the terminal assemblies of FIG. 6 are assembled along another direction.

Please refer to FIGS. 1 to 8, FIG. 1 is a perspective schematic view of an SEP socket connector 1 of the present invention; FIG. 2 is a perspective schematic view of the SFP socket connector 1, wherein a shielding case 10 is disassembled; FIG. 3 is a perspective schematic view showing that a spacer 15 and a grounding spring 16 of FIG. 2 are further disassembled; FIG. 4 is a perspective schematic view showing that a light guide tube assembly 20 of FIG. 3 is disassembled; FIG. 5 is a perspective schematic view of a socket housing 30 and multiple terminal assemblies 40, which are disassembled; FIG. 6 is a perspective schematic view of the socket housing 30 and the terminal assemblies 40, which are assembled; FIG. 7 is a perspective schematic view showing that the socket housing 30 and the terminal assemblies 40 of FIG. 5 are disassembled along another direction; and FIG. 8 is a perspective schematic view showing that the socket housing 30 and the terminal assemblies 40 of FIG. 6 are assembled along another direction.

Please refer to FIGS. 1 to 8, the SFP socket connector 1 of the present invention comprises a shielding case 10, a light guide tube assembly 20, a socket housing 30 and multiple terminal assemblies 40.

As shown in FIG. 1, the shielding case 10 forms an upper port 101 and a lower port 102, which are located in the front of the shielding case 10 and are vertically spaced apart, to be used for receiving an outer plug module (not shown).

As shown in FIG. 2, the shielding case 10 includes a shielding frame 11, a bottom plate 12 mounted on the shielding frame 11, a rear plate 13 mounted on the shielding frame 11, two covers 14 around the front of the shielding frame 11, a spacer 15 located in the middle of the shielding frame 11 for separating the upper port 101 and the lower port 102, and a grounding spring 16 being located inside the shielding frame 11 and being fixed on the socket housing 30.

As shown in FIG. 3, the spacer 15 is U-shaped, and has an upper horizontal plate 150 and a lower horizontal plate 151. The upper horizontal plate 150 forms a pair of upper slits 152 on the rear thereof, and the lower horizontal plate 151 forms a pair of lower slits 153 on the rear thereof. The spacer 15 can be fixed on the socket housing 30 by the upper slits 152 and the lower slits 153 clamping two sidewalls 314 (label seen in FIG. 5) of the socket housing 30.

As shown in FIG. 3, the grounding spring 16 is U-shaped too. It has a pair of first elastic fingers 160 protruding forward and a pair of second elastic fingers 161 respectively protruding toward two sides. The pair of first elastic fingers 160 can contact with a shielding shell of the outer plug module, and the pair of second elastic fingers 161 can contact with the shielding frame 11, thereby forming a complete grounding path.

As shown in FIG. 4, the light guide tube assembly 20 includes two pairs of light guide tubes 21, 22, tails of which are mounted on two sides of the socket housing 30, and front ends of which are located in front of the socket housing 30 and are fixed by a retainer 23. Each pair of the light guide tubes 21, 22 include two symmetrical light guide tubes, which are connected and fixed together, and are made of materials suitable for propagating light. Moreover, as shown in FIG. 2, the spacer 15 can substantially cover the light guide tube assembly 20.

Please refer to FIGS. 5 to 8, the socket housing 30 has a mating portion 31 extending forward and a mounting portion 32 extending rearward. The mating portion 31 is used to receive upper and lower plug circuit boards of the outer plug module, and the mounting portion 32 is used to install the socket housing 30 on an outer circuit board (not shown).

Specially, as shown in FIG. 5, the mating portion 31 includes an opening 310 located on the front thereof, and a receiving cavity 311 extending rearward from the opening 310. The upper and lower plug circuit boards of the outer plug module are inserted from the opening 310 and are received in the receiving cavity 311. The mating portion 31 further includes a top wall 312, a bottom wall 313, two sidewalls 314 and a rear wall 315, which together define the receiving cavity 311 and the opening 310. The mating portion 31 further includes a row of upper support bars 33 being located in the receiving cavity 311 and being adjacent to the top wall 312, and a row of lower support bars 34 being located in the receiving cavity 311 and being adjacent to the bottom wall 313. These upper support bars 33 are symmetrical to these lower support bars 34. All the bars 33, 34 horizontally extend forward from the rear wall 315 and do not extend out of the mating portion 31. Namely, front ends of these bars 33, 34 are not over the front of the mating portion 31. Furthermore, in the embodiment, these upper support bars 33 include a pair of upper support bars 33' with large sizes and multiple upper support bars 33" with small sizes. The length of each large-size upper support bar 33' is more than that of each small-size upper support bar 33". These lower support bars 34 include a pair of lower support bars 34' with large sizes and multiple lower support bars 34" with small sizes. The length of each large-size lower support bar 34' is more than that of each small-size lower support bar 34". It is noted that these large-size upper and lower support bars 33', 34' do not extend out of the mating portion 31.

As shown in FIG. 7, the mounting portion 32 forms a mounting space 320 to receive or fix these terminal assemblies 40. There forms multiple swallow-tailed long grooves 321 on the top of the mounting space 320 to fix the corresponding terminal assembles 40.

Please refer to FIGS. 5 and 7, the socket housing 40 further includes two rows of upper terminal-receiving grooves 35, two rows of lower terminal-receiving grooves 36 and a row of through holes 37.

The two rows of upper terminal-receiving grooves 35 include one row of upper terminal-receiving grooves 35' located on an inner side of the top wall 312 and extending to the mounting space 320, and the other row of upper terminal-receiving grooves 35", some of which are formed between these small-size upper support bars 33" and others of which are formed on the top of the pair of large-size upper support bars 33'. Moreover, the other row of upper terminal-receiving grooves 35" also extends to the mounting space 320. In this embodiment, the other row of upper terminal-receiving grooves 35" has two upper terminal-receiving grooves 35" formed on the top of the pair of large-size upper support bars 33'.

The two rows of lower terminal-receiving grooves 36 include one row of lower terminal-receiving grooves 36' located on an inner side of the bottom wall 313 and extending to the mounting space 320, and the other row of lower terminal-receiving grooves 36", some of which are formed between these small-size lower support bars 34" and others of which are formed on the bottom of the pair of large-size lower support bars 34'. Moreover, the other row of lower terminal-receiving grooves 36" also extends to the mounting space 320.

The row of through holes 37 passes through the rear wall 315 and extend to the mounting space 320.

As shown in FIG. 5, the mating portion 31 disposes two rectangular recesses 316, which are respectively formed on the front of the two sidewalls 314. The vertical height of each recess 316 is generally same with the vertical distance between the upper and lower horizontal plate 150, 151 (label seen in FIGS. 2 and 3) of the spacer 15. Therefore, the upper and lower horizontal plate 150, 151 can enter into the recesses 316, and a vertical edge 317 of each recess 316 can be successfully inserted into the corresponding upper and lower slits 152, 153 of the upper and lower horizontal plate 150, 151, thereby fixing the spacer 15. By this structure design, the upper port 101 of the shielding case 10 can be aligned with the two rows of upper terminal-receiving grooves 35, and the lower port 102 thereof can be aligned with the two rows of lower terminal-receiving grooves 36.

As shown in FIG. 5, these terminal assemblies 40 include multiple signal terminal assemblies 41 and multiple ground terminal assemblies 42. These terminal assemblies 40 are arranged side by side in the order of ground-signal-signal.

As shown in FIG. 5, each terminal assembly 40 includes a support frame 400, a pair of upper conductive contact parts 401 extending forward from the front of the support frame 400, a pair of lower conductive contact parts 402 extending forward from the front of the support frame 400, and four conductive tails 403 extending downward from the bottom of the support frame 400. The pair of upper conductive contact parts 401 are not aligned along the up and down direction and slightly staggered along the left and right direction. Similarly, the pair of lower conductive contact parts 402 are also not located in a same vertical plane, but located in two different vertical planes. The four conductive tails 403 are not aligned in one straight line, but are staggered.

Moreover, each terminal assembly 40 also includes a positioning piece 404, which extends forward from the front of the support frame 400 and is located between the pair of upper conductive contact parts 401 and the pair of lower conductive contact parts 402.

As shown in FIG. 5, the support frame 400 forms a half swallow-tailed long protrusion 405 on the top thereof. The half swallow-tailed long protrusions 405 of two adjacent terminal assemblies 40 can construct a complete swallow-tailed long protrusion 405', which can be engaged with the corresponding swallow-tailed long groove 321 of the socket housing 30, whereby the terminal assembly 40 is fixed on the socket housing 30.

Please refer to FIGS. 5 and 7, these terminal assemblies 40 are inserted into the socket housing 30 from the rear of the mounting portion 32 along the corresponding long grooves 321. For a single terminal assembly 40, the pair of upper conductive contact parts 401 thereof are inserted into the corresponding upper terminal-receiving grooves 35 and are exposed in the receiving cavity 311 to be ready to be electrically connected with the upper plug circuit boards of the outer plug module; the pair of lower conductive contact parts 402 thereof are inserted into the corresponding lower terminal-receiving grooves 36 and are exposed in the receiving cavity 311 to be ready to be electrically connected with the lower plug circuit boards of the outer plug module; and the positioning piece 404 thereof is inserted into the corresponding through hole 37 and is exposed in the receiving cavity 311.

As described above, the SFP socket connector 1 of the present invention employs the socket housing 30, which disposes the mating portion 31 with one receiving cavity 311 for receiving the outer plug module and the mounting portion 32 with a mounting space 320 for receiving these terminal assemblies 40. The socket housing 30 has a compact structure, which can make the SFP socket connector 1 be small and light.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An SFP socket connector comprising:
a socket housing including a mating portion extending forward and a mounting portion extending rearward; the mating portion having an opening located on the front of the mating portion and a receiving cavity extending rearward from the opening; the mating portion further having a top wall, a bottom wall, a rear wall and two sidewalls, which together define the receiving cavity and the opening; the mating portion including a row of upper support bars located in the receiving cavity and adjacent to the top wall, and a row of lower support bars located in the receiving cavity and adjacent to the bottom wall; the upper and lower support bars being symmetrical to each other, horizontally extending forward from the rear wall and being not exposed outside the mating portion; the mounting portion forming a mounting space; the socket housing further including two rows of upper terminal-receiving grooves and two rows of lower terminal-receiving grooves; one row of upper terminal-receiving grooves being located on an inner side of the top wall and extending to the mounting space, and some of the other row of upper terminal-receiving grooves being formed between these upper support bars and extending to the mounting space; one row of lower terminal-receiving grooves being located on an inner side of the bottom wall and extending to the mounting space, and some of the other row of lower terminal-receiving grooves being formed between these lower support bars and extending to the mounting space;
a shielding case being mounted on the socket housing and having an upper port and a lower port; the upper port being aligned with the two rows of upper terminal-receiving grooves, and the lower port being aligned with the two rows of lower terminal-receiving grooves;
multiple terminal assemblies being mounted in the socket housing and including multiple signal terminal assemblies and multiple ground terminal assemblies, which are arranged side by side in the order of ground-signal-signal; each terminal assembly including a support frame, a pair of upper conductive contact parts extending forward from the front of the support frame, a pair of lower conductive contact parts extending forward from the front of the support frame, and four conductive tails extending downward from the bottom of the support frame; wherein the pair of upper conductive contact parts are inserted into the corresponding upper terminal-receiving grooves and are exposed in the receiving cavity, and the pair of lower conductive contact parts are inserted into the corresponding lower terminal-receiving grooves and are exposed in the receiving cavity; and
a light guide tube assembly being mounted on the socket housing.

2. The SFP socket connector as claimed in claim 1, wherein the socket housing further includes a row of through holes passing through the rear wall and extending to the mounting space;
each terminal assembly further includes a positioning piece, which extends forward from the front of the support frame and is located between the pair of upper conductive contact parts and the pair of lower conductive contact parts.

3. The SFP socket connector as claimed in claim 1, wherein these upper support bars include a pair of large-size upper support bars and multiple small-size upper support bars; the length of each large-size upper support bar is more than that of each small-size upper support bar;
these lower support bars include a pair of large-size lower support bars and multiple small-size lower support bars; the length of each large-size lower support bar is more than that of each small-size lower support bar;
some of the other row of upper terminal-receiving grooves are formed between these small-size upper support bars, and others thereof are formed on the top of the pair of large-size upper support bars; and
some of the other row of lower terminal-receiving grooves are formed between these small-size lower support bars, and others thereof are formed on the bottom of the pair of large-size lower support bars.

4. The SFP socket connector as claimed in claim 1, wherein the mounting portion forms multiple swallow-tailed long grooves on the top of the mounting space; and
the support frame forms a half swallow-tailed long protrusion on the top of the support frame; the half swallow-tailed long protrusions of two adjacent terminal assemblies construct a complete swallow-tailed long protrusion to be engaged with the corresponding swallow-tailed long groove.

5. The SFP socket connector as claimed in claim 1, wherein the pair of upper conductive contact parts are slightly staggered along the left and right direction, the pair of lower conductive contact parts are also slightly staggered along the left and right direction, and the four conductive tails are not aligned in one straight line, but are staggered.

6. The SFP socket connector as claimed in claim 1, wherein the shielding case includes a shielding frame, a bottom plate mounted on the shielding frame, a rear plate mounted on the shielding frame, two covers around the front of the shielding frame, a spacer located in the middle of the shielding frame for separating the upper port and the lower port, and a grounding spring being located inside the shielding frame and being fixed on the socket housing.

7. The SFP socket connector as claimed in claim 6, wherein the spacer is U-shaped, and has an upper horizontal plate and a lower horizontal plate; the upper horizontal plate forms a pair of upper slits on the rear thereof, and the lower horizontal plate forms a pair of lower slits on the rear thereof; and
the mating portion disposes two recesses, which are respectively formed on the front of the two sidewalls; the upper and lower horizontal plate enter into the recesses, and a vertical edge of each recess is successfully inserted into the corresponding upper and lower slits for fixing the spacer.

8. The SFP socket connector as claimed in claim 6, wherein the grounding spring is U-shaped, and has a pair of first elastic fingers protruding forward and a pair of second elastic fingers respectively protruding toward two sides.

9. The SFP socket connector as claimed in claim 1, wherein the light guide tube assembly includes two pairs of light guide tubes, tails of which are mounted on two sides of the socket housing, and front ends of which are located in front of the socket housing and are fixed by a retainer; each pair of the light guide tubes include two symmetrical light guide tubes, which are connected and fixed together, and are made of materials suitable for propagating light.

* * * * *